United States Patent
Muller et al.

(10) Patent No.: US 10,308,281 B2
(45) Date of Patent: Jun. 4, 2019

(54) METHOD FOR IMPROVING THE STEERING FEEL IN THE CASE OF A RECIRCULATING BALL STEERING SYSTEM

(71) Applicant: Tedrive Steering Systems GmbH, Wülfrath (DE)

(72) Inventors: Jens-Hauke Muller, Velbert-Neviges (DE); Olaf Schulte, Ratingen (DE); Sven Kirschbaum, Mettmann (DE)

(73) Assignee: Tedrive Steering Systems GmbH, Wülfrath (DE)

( * ) Notice: Subject to any disclaimer, the term of this patent is extended or adjusted under 35 U.S.C. 154(b) by 159 days.

(21) Appl. No.: 15/535,149

(22) PCT Filed: Dec. 8, 2015

(86) PCT No.: PCT/EP2015/078953
§ 371 (c)(1),
(2) Date: Jun. 12, 2017

(87) PCT Pub. No.: WO2016/091866
PCT Pub. Date: Jun. 16, 2016

(65) Prior Publication Data
US 2017/0361871 A1 Dec. 21, 2017

(30) Foreign Application Priority Data
Dec. 12, 2014 (DE) .................. 10 2014 118 567

(51) Int. Cl.
*B62D 5/12* (2006.01)
*B62D 5/24* (2006.01)
(Continued)

(52) U.S. Cl.
CPC ............. *B62D 5/24* (2013.01); *B62D 5/0463* (2013.01); *B62D 5/0835* (2013.01); *B62D 5/12* (2013.01); *B62D 7/159* (2013.01)

(58) Field of Classification Search
CPC ...... B62D 5/24; B62D 5/0463; B62D 5/0835; B62D 5/12; B62D 7/159
See application file for complete search history.

(56) References Cited

U.S. PATENT DOCUMENTS 6,152,254 A * 11/2000 Phillips ................ B62D 5/0463
180/421
6,546,322 B2 * 4/2003 Williams ............. B62D 5/0463
180/410
(Continued)

FOREIGN PATENT DOCUMENTS

DE 10058275 7/2002

OTHER PUBLICATIONS

Internationaler Recherchenbericht und Schriftlicher Bescheid [International Search Report and the Written Opinion] dated Feb. 18, 2016 From the International Searching Authority Re. Application No. PCT/EP2015/078953 and Its Translation of Search Report Into English. (10 Pages).

*Primary Examiner* — Joseph M Rocca
*Assistant Examiner* — Michael R Stabley

(57) ABSTRACT

The invention relates to a method for compensating a stick-slip effect in the case of a recirculating ball steering system (20) having a steering housing (22), in which a steering piston (24) is supported between a first working chamber (34) and a second working chamber (36), wherein the steering piston (24) has a toothed region (26) on the steering-piston outer wall of the steering position, with which toothed region teeth (28) of a segment shaft (30) mesh, the steering piston (24) can be moved along a longitudinal axis X-X, the working chambers (34, 36) are connected to a control valve (39) by means of pressure-medium lines in order to provide steering assistance, the control valve (39) is connected to a processor unit (40), by means of which valves of the control valve (39) can be actuated, and
(Continued)

Figure 1:
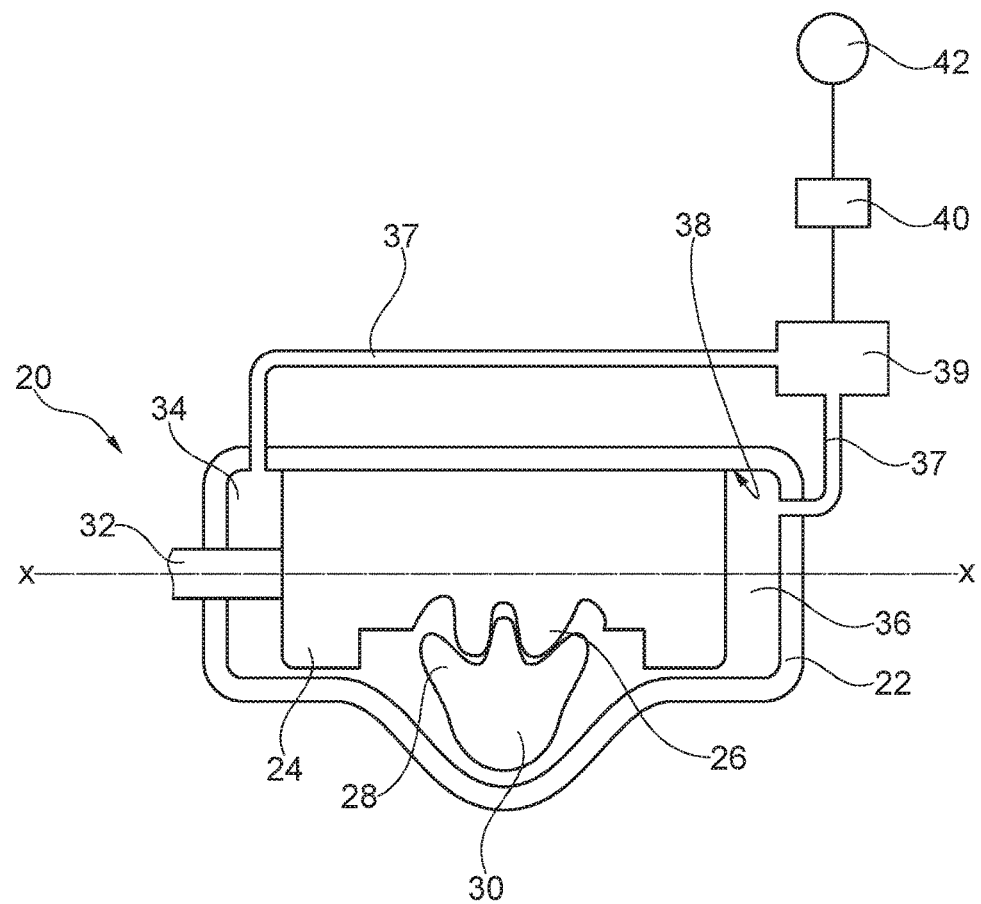

the processor unit (40) is connected to a sensor (42), which determines rotation of the steering column both in a first direction of rotation and in a second, opposite direction of rotation. When a rotational motion of the steering column in a first direction occurs and thereafter the rotational motion in said direction nearly or completely stops, the valves of the control valve (39) are opened by the processor unit (40) in such a way that the pressure in the working chamber (34, 36) of the steering piston (24) facing away from the direction of motion of the steering piston (24) is reduced and immediately thereafter the pressure in the same working chamber (34, 36) is increased again.

10 Claims, 3 Drawing Sheets

(51) Int. Cl.
  *B62D 5/04* (2006.01)
  *B62D 5/083* (2006.01)
  *B62D 7/15* (2006.01)

(56) References Cited

U.S. PATENT DOCUMENTS

| | | | |
|---|---|---|---|
| 7,225,894 B2 * | 6/2007 | Broughton | B62D 5/063 180/417 |
| 7,364,004 B2 * | 4/2008 | Williams | B62D 5/063 180/421 |
| 8,439,151 B2 * | 5/2013 | Williams | B62D 5/063 180/417 |
| 2006/0175119 A1 | 8/2006 | Broughton | |

* cited by examiner

METHOD FOR IMPROVING THE STEERING FEEL IN THE CASE OF A RECIRCULATING BALL STEERING SYSTEM

RELATED APPLICATIONS

This application is a National Phase of PCT Patent Application No. PCT/EP2015/078953 having International filing date of Dec. 8, 2015, which claims the benefit of priority of German Patent Application No. 10 2014 118 567.6 filed on Dec. 12, 2014. The contents of the above applications are all incorporated by reference as if fully set forth herein in their entirety.

FIELD AND BACKGROUND OF THE INVENTION

The invention at hand shows a method for improving the steering feel of a recirculating ball steering system, in particular for compensating a stick-slip effect.

SUMMARY OF THE INVENTION

In the case of a recirculating ball steering system, a steering piston is supported be abstract tween a first working chamber and a second working chamber in a steering housing, wherein the steering piston has a toothed region on its steering piston outer wall, with which teeth of a segment shaft engage. To provide steering assistance, the working chambers are connected to a control valve via pressure medium lines and the steering piston can be axially moved along a longitudinal axis. If required, the working chambers are filled with the pressure medium via the control valve, so as to be able to assist the movement of the steering piston in both directions. The steering movement of the driver is typically initiated with the help of a steering wheel, but alternative systems, for example a joy stick, are also conceivable.

Recirculating ball steering systems are parts of the steering gears, which, depending on the design, either directly or indirectly transfers the rotational motion of a steering wheel to steering tie rods via rodding. A recirculating ball steering system is a type of spindle steering, in the case of which the force between spindle and nut is transmitted by balls, which circulate in the threads.

Such steering gears have been known for a long time and are available in a variety of designs. For example documents DE 100 58 275 A1, DE 34 14 891 A1 and DE 199 11 891 A1 describe such recirculating ball steering systems.

Recirculating ball steering systems are used in light-duty and heavy-duty utility vehicles, among others. It turned out that known recirculating ball steering systems have an unwanted so-called stick-slip effect, which has a negative impact on the steering feel. The driver feels that he must initially overcome a resistance, before the steering movement is possible in an even manner and with constant expenditure of force. Furthermore, there is an associated increased wear.

It is known that the control valve can be connected to a processor unit, via which the valves of the control valve can be actuated. The processor unit, in turn, is connected to a sensor, which determines a rotation of the steering column or the applied torque, respectively, by the driver. Such sensors and processor units are utilized for example in connection with drive assistance systems or with parking aids.

It is the object of the invention to avoid the above-mentioned disadvantages of the prior art. In particular, a method for improving the steering feel in the case of a recirculating ball steering system is to be provided. The method is to make it possible to reduce the stick-slip effect. The steering feel is to be pleasant and even. The recirculating ball steering system is to thereby nonetheless be capable of being produced in a cost-efficient manner.

According to the invention, the object is solved by proceeding according to the independent method claim.

The method has the effect that, when a determined steering angle speed of the steering train in a first direction is greater than zero and is nearly or equal to zero thereafter, the valves of a control valve are opened in such a way by means of a processor unit, which is connected to a sensor, that the pressure in a working chamber of the steering piston facing away from the direction of motion of a steering piston is reduced and immediately thereafter the pressure in the same working chamber is increased again.

The steering force from the chassis frame created in response to steering is fed back to the steering piston via a steering column lever and the segment shaft. This effect follows from the fact that separation forces, which result from the toothing and which push these two components apart, are created between the steering piston and the segment shaft. On its side located opposite the toothing, the steering piston is pushed against the inner steering housing wall. Even though pressure medium, typically hydraulic oil, is located in the steering piston chamber, it cannot act as oil film to reduce friction, due to the quasi static motion. As a result, a large friction is created between the inner steering housing wall and the outer steering piston wall, which leads to the mentioned stick-slip effect, but also the wear of the components and thus to a further increase of friction.

The inventor recognized that the unsteadiness in the steering feel is caused, among other things, by the fact that the system pressure is lowered to below the force level, which is required in the actual steering situation, via the relaxation of a T-bar in the control valve, in order to move the steering piston from the static friction. This has the result that the T-bar is relaxed too much for this steering situation, thus resulting in a torque increase in the steering feel, shortly after the steering piston has transitioned into the sliding friction, in order to raise the system pressure again.

In response to steering back, the pressure in one of the two working chambers thus drops to such an extent that the steering piston should actually move. Due to the adhesion between the inner steering housing wall and the outer steering piston wall, however, the steering piston does not move initially, in order to then move relatively quickly. The steering piston thus quasi falls suddenly and must then be caught again by increasing the working medium pressure. This process can be felt on the steering wheel and is perceived as being bothersome.

This problem arises in particular when the steering wheel and thus the wheels are turned completely in one direction and a back-steering occurs subsequently. The steering or the steering train, respectively, is rotated in this situation with a certain steering angle speed, which is reduced to 0 upon stop. In this situation, the steering piston gets stuck, so to speak. By means of steering back, the steering angle speed increases again. In other words, the steering angle speed initially has a positive value in the first direction, is then 0, and subsequently has a negative value when steering back into the opposite second direction.

The invention makes use of the fact that a determination of a signal, which indicates the change of the steering direction, for example the steering angle speed or also the steering torque, is possible almost in real time via a sensor. According to the invention, this information can be used to compensate the time delay of the motion of the steering piston, thus the stick-slip effect. Based on the information from the sensor with regard to the steering angle speed, the system pressure is reduced so early that the steering piston breaks loose, without relaxing the T-bar too much. The abrupt breaking loose of the steering piston via a pressure pulse in opposite direction is damped again immediately in a second step.

Systems are also known, in the case of which an additional motor (CEPs), via which overlay torques can be brought to the steering wheel, is arranged directly on the recirculating ball steering system or in the steering column. It is also possible to compensate the described stick-slip effect via this system.

The invention will be explained below in an exemplary manner by using the steering angle speed signal, which, however, will only be described representative for the other options. It is significant that the compensation measure is initiated when a rotational motion of the steering column occurs in a first direction and the rotational motion in said direction nearly or completely stops thereafter.

The steering angle speed signal from the sensor is processed via a processor unit. It is initially identified that the steering angle speed is greater than 0, until it drops back to 0 in response to stop or also stopping prior to the steering stop of the steering wheel. The signal or information follows, respectively, that the steering angle speed increases again when steering back into the opposite direction. This information is utilized immediately in that a corresponding valve of the control valve or of the valve sleeve, respectively, is opened excessively, in particular farther than the driver would have actually brought about by means of his steering movement. The pressure in the corresponding working chamber is thus lowered immediately and correspondingly quickly, so that the steering piston can break loose. In a next step, the process unit effects that the control valve is moved or adjusted, respectively, in such a way that the pressure in the corresponding working chamber rises immediately and quickly, in order to prevent an excessive movement of the steering piston.

According to the invention, provision can be made for the compensation measures to only be initiated when the time period, in which the steering angle speed is nearly or approximately 0, lasts at least 20 ms. In so doing, it is to be avoided that the described measures are also taken, if no stick-slip effect has set in yet.

In an alternative embodiment of the invention, the process unit has the effect that the pressure is already reduced in the corresponding working chamber when the steering piston stops, thus in response to the final stop of the steering wheel. In response to steering back, the steering piston thus breaks loose more quickly than would be the case in the case of the common stick-slip effect. The reduction of the steering angle speed to 0 is thus already used as triggering signal, without waiting for the steering angle speed to increase again in the opposite direction. The pressure in the corresponding working chamber is thereby reduced to the extent that the steering piston is barely held. When the steering wheel is then moved in opposite direction, the steering piston disengages immediately.

Signals from a sensor, which measures the steering angle speed, are preferably used to control the compensation method. In addition to a torque sensor, such a sensor can be arranged in the path of the steering column, preferably on an input shaft of the control valve. Oftentimes, this is a combined steering/torque sensor, which is used for further typical iHSA functions, such as CityMode. According to the invention, however, a combination of torque sensor and steering angle speed sensor can also be used. In the alternative or in addition, however, provision can for example also be made for a sensor to determine the final stop of the steering piston and to transfer this signal to the process unit. Based on this signal, the pressure in the working chamber, which is relevant for the return path of the steering piston, can already be lowered.

According to the invention, provision can be made that, when the pressure is reduced in the working chamber of the steering piston facing away from the direction of motion of the steering piston, the pressure in the other working chamber is increased simultaneously and is subsequently reduced in this working chamber, when the pressure in the working chamber of the steering piston facing away from the direction of motion of the steering piston, is increased again. On principle, the proper compensation method is then simultaneously controlled via both working chambers.

The invention will be explained in more detail by means of the following figures:

BRIEF DESCRIPTION OF THE SEVERAL VIEWS OF THE DRAWING(S)

Figure 2:
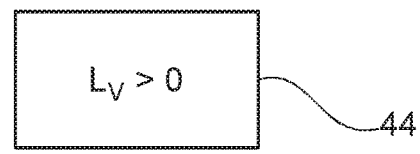
Figure 2:
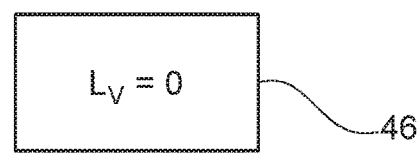
Figure 2:
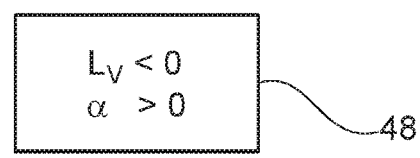
Figure 2:
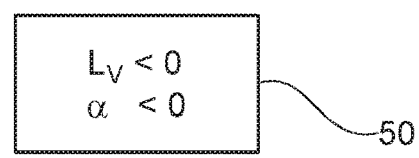
Figure 2:
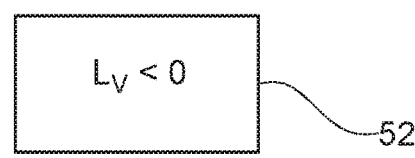
Figure 3:
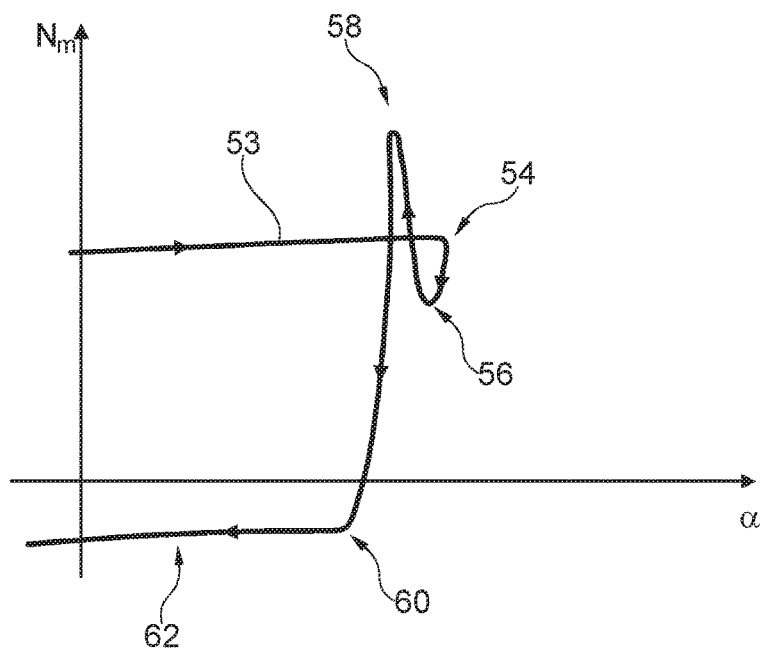
Figure 4:
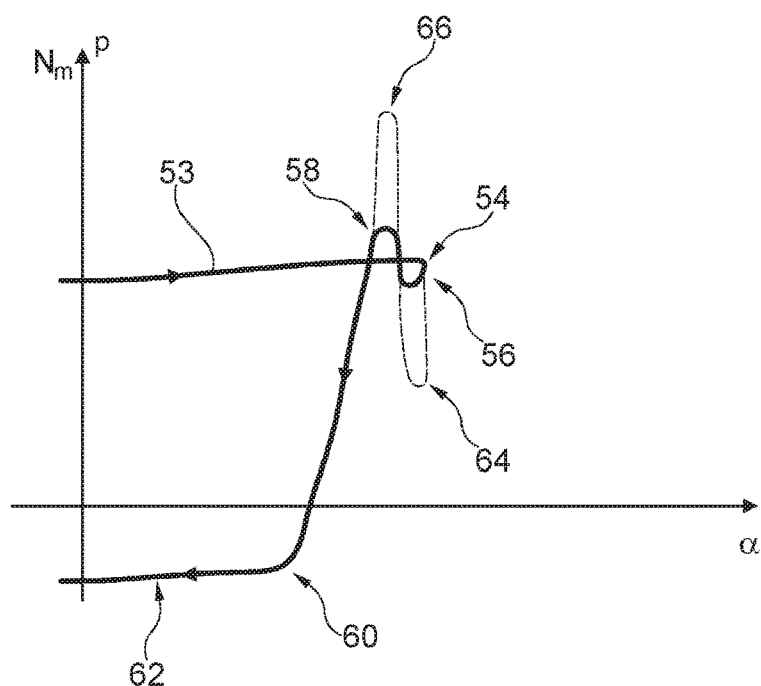

FIG. 1 shows a simplified schematic diagram of a recirculating ball steering system, FIG. 2 shows a block diagram for clarifying the method, FIG. 3 shows a graphic illustration of the pressure and angle ratios in the steering system, without compensation according to the invention, FIG. 4 shows a graphic illustration of the pressure and angle ratios in the steering system, with compensation according to the invention.

DESCRIPTION OF SPECIFIC EMBODIMENTS OF THE INVENTION

A recirculating ball steering system 20 according to the invention is shown in cross section in FIG. 1 in a highly simplified illustration. This schematic diagram is to only be understood in an exemplary manner, the invention is in no way to be limited to the shown figures. To be able to better illustrate the invention, the figures do not represent the components true to scale. In addition to a variety of non-illustrated components, it has a steering housing 22, in which a steering piston 24 can be moved along a longitudinal axis X-X.

A circulating ball steering system 20 according to the invention is shown in a highly simplified illustration in cross section in FIG. 1. In addition to a variety of non-illustrated components, it has a steering housing 22, in which a steering piston 24 can be moved along a longitudinal axis X-X.

The steering piston 24 has a tooting area 26, with which teeth 28 of a segment shaft 30 engage. A longitudinal movement of the steering piston 24 along the longitudinal axis X-X effects a rotation of the segment shaft 30, which simultaneously represents a drive shaft and which adjusts the steering angle of the vehicle.

The longitudinal movement of the steering piston 24 by the drive is effected via a drive shaft 32, which is connected to a non-illustrated steering device, for example a steering wheel or a joy stick. The recirculating ball steering system 20 reinforces the rotational motion of the drive shaft 32 resulting from the actuation of the steering device.

The steering piston 24 divides the interior of the steering housing 22 into a first working chamber 34 and a second working chamber 36. The working chambers 34, 36 are connected to a control valve 39 via connections and pressure medium lines 37. A pressure medium, typically hydraulic oil, is pumped into the working chambers 34, 36 via this control valve, in order to assist the motion of the steering piston 24.

A non-illustrated steering spindle, which is connected to the drive shaft 32, is arranged in the interior of the steering piston 24. The steering spindle is supported in a rotatable, but axially immovable manner in the steering housing. The steering spindle has a recirculating ball, via which the steering piston 24 can be moved along the longitudinal axis X-X.

As already discussed, separation forces are created in response to the steering between the segment shat 30 and the steering piston 24 in the area of the toothing area 26, which push these two components apart. On the side located radially opposite the toothing area 26, the steering piston 24 is hereby pushed against an inner steering housing wall 38, whereby the unwanted stick-slip effect and the associated increased wear is created.

The control valve 39 has a unit, which is driven via an external drive, via which corresponding valves for the pressure medium can be opened and closed from the outside, thus independent from the steering movement of the diver. Such a unit can represent a valve sleeve, for example.

According to the invention, the external drive of the control valve 39 is connected to a processor unit 40. The control valve 39 can thus be moved via the process unit 40 and the external drive.

The process unit 39, in turn, is connected to a sensor 42 and considers signals and information from said sensor in order to control the control valve 39.

FIG. 2 illustrates the sequence of the method according to the invention in a block diagram.

In a first method step 44, the steering wheel is initially steered. The steering angle speed Lv reported by the sensor 42 is thereby greater than 0. As already stated, the steering angle speed (Lv) can be determined immediately, in the alternative, however, it is also possible to deduce it from the steering torque signal via the steering angle speed (Lv). A signal, which indicates the change in direction of the direction of rotation, can thus for example be formed via the steering angle, the steering torque, or by both signals.

The end stop/stopping of the steering wheel and of the steering piston 24 occurs (second method step 46) occurs. The steering angle seed Lv thus drops to 0, the steering piston 24 does not move any longer.

The onset of the steering back occurs in a third method step 48. The steering angle speed Lv increases again in opposite direction, represented by LV<0. The processor unit 40 engages at this point and opens a valve, whereby the pressure drops quickly in the working chamber 34, for example, so that the steering piston 24 is released as quickly as possible and can move. Due to the fact that the invention is particularly suitable for a use with an externally drivable valve sleeve, which releases valve openings as a result of its rotation, a valve opening angle is identified with a in FIG. 2. Due to the fact that the processor unit 40 actively rotates the valve sleeve, the valve opening angle α is greater than 0.

The fourth method step 50 describes the state, in which the steering piston 24 has just broken loose, thus moves. The steering angle speed Lv is still less than 0. The process unit 40 influences the control valve 39 or the valve sleeve, respectively, in such a way that the pressure is built up as quickly as possible again in working chamber 34, in order to generate a counter impulse and to brake the steering piston 24. The valve sleeve rotates accordingly and the valve opening angle α is less than 0.

In the fifth and last method step 52, the further steering back into the initial position occurs, the steering angle speed Lv is thus still less than 0. An engaging by the process unit 40 is not necessary during this method step, the valve opening angle is thus 0.

FIGS. 3 and 4 clarify the effect of the method according to the invention, wherein FIG. 3 clarifies the states without the compensation according to the invention and FIG. 4 clarifies the states with compensation according to the invention.

The steering angle α is outlined on the x axis and the force to be applied to the steering wheel by the driver is outlined in N on the y axis. The process starts with steering 53 to the stop 54. The steering back occurs, whereby the T bar relaxes and the pressure drops. The force on the steering wheel to be applied by the driver also drops significantly, because the steering piston 24 initially sticks due to the stick-slip effect and suddenly breaks loose subsequently (point 56). A rise of the necessary force occurs due to the relaxed T bar and the small system pressure (point 58). The necessary expenditure of force drops further only thereafter (point 60) and a steering back, which is linear based on the expenditure of force (point 62).

FIG. 4 shows the impact of the method according to the invention, by means of which the unwanted understeering or oversteering effect, respectively (points 56 and 58) can be reduced. In addition to the necessary expenditure of force, the pressure in the corresponding working chamber 34, 36 is furthermore outlined in dashed lines on the y axis in FIG. 4. It can be seen clearly that a significant pressure decrease occurs in the working chamber 34, 36 (point 64), immediately after reaching the stop at 54 or with the onset of the steering back, respectively. The pressure in the working chamber 34, 36 is increased again immediately following this (point 66). Accordingly, the steering torque peaks (points 56, 58), which the driver can feel, are significantly reduced.

The invention is not limited to the described exemplary embodiments, they only serve to explain the basic idea of the invention.

What is claimed is:

1. A system for compensating a stick-slip effect in a recirculating ball steering system (20) comprising a steering housing (22), in which a steering piston (24) is supported between a first working chamber (34) and a second working chamber (36), wherein
    the steering piston (24) has a toothed region (26) on its steering piston outer wall, with which teeth (28) of a segment shaft (30) engage,
    the steering piston (24) can be moved along a longitudinal axis X-X,
    the working chambers (34, 36) are connected to a control valve (39) by means of pressure medium lines in order to provide steering assistance,
    the control valve (39) is connected to a processor unit (40), by means of which the valves of the control valve (39) can be actuated, and
    the processor unit (40) is connected to a sensor (42), which determines a rotation of the steering column both in a first direction of rotation and in a second, opposite direction of rotation,
    characterized in that when a rotational motion of the steering column in a first direction occurs and thereafter the rotational motion in said direction nearly or completely stops, the valves of the control valve (39) are opened by the processor unit (40) in such a way that the pressure in the working chamber (34, 36) of the steering piston (24) facing away from the direction of motion of the steering piston (24) is reduced and immediately thereafter the pressure in the same working chamber (34, 36) increases again.

2. The system according to claim 1, characterized in that, when a steering angle speed (Lv) in a first direction is greater than zero and is nearly or equal to zero thereafter, the valves of the control valve (39) are opened in such a way by means of the processor unit (40) that the pressure in a working chamber (34, 36) of the steering piston (24) facing away from the direction of motion of the steering piston (24) is reduced and immediately thereafter the pressure in the same working chamber (34, 36) is increased again.

3. The system according to claim 2, characterized in that, when the pressure is reduced in the working chamber (34, 36) of the steering piston (24) facing away from the direction of motion of the steering piston (24), the pressure in the other working chamber (34, 36) is increased simultaneously and is subsequently reduced in this working chamber (34, 36), when the pressure in the working chamber (34, 36) of the steering piston (24) facing away from the direction of motion of the steering piston (24), is increased again.

4. The system according to claim 2 characterized in that the pressure in the working chamber (34, 36) of the steering piston (24) facing away from the direction of motion of the steering piston (24) is reduced and immediately thereafter the pressure in the same working chamber (34, 36) is increased again, when the time period of the state, in which the steering angle speed (Lv) is nearly or approximately 0, lasts more than 20 ms.

5. The system according to claim 2, characterized in that the sensor (42) identifies an end stop of the steering piston (24) and thereupon emits a corresponding signal that the steering angle speed (Lv) is nearly or equal zero.

6. The system according to claim 1, characterized in that, when the pressure is reduced in the working chamber (34, 36) of the steering piston (24) facing away from the direction of motion of the steering piston (24), the pressure in the other working chamber (34, 36) is increased simultaneously and is subsequently reduced in this working chamber (34, 36), when the pressure in the working chamber (34, 36) of the steering piston (24) facing away from the direction of motion of the steering piston (24), is increased again.

7. The system according to claim 6, characterized in that the sensor (42) identifies an end stop of the steering piston (24) and thereupon emits a corresponding signal that the steering angle speed (Lv) is nearly or equal zero.

8. The system according to claim 1, characterized in that the pressure in the working chamber (34, 36) of the steering piston (24) facing away from the direction of motion of the steering piston (24) is reduced and immediately thereafter the pressure in the same working chamber (34, 36) is increased again, when the time period of the state, in which the steering angle speed (Lv) is nearly or approximately 0, lasts more than 20 ms.

9. The system according to claim 8, characterized in that the sensor (42) identifies an end stop of the steering piston (24) and thereupon emits a corresponding signal that the steering angle speed (Lv) is nearly or equal zero.

10. The system according to claim 1, characterized in that the sensor (42) identifies an end stop of the steering piston (24) and thereupon emits a corresponding signal that the steering angle speed (Lv) is nearly or equal zero.

\* \* \* \* \*